Aug. 8, 1939.　　　　K. E. BEMIS　　　　2,168,391
BAKING AND COOKING OVEN
Filed April 19, 1938

Inventor
Kenneth E. Bemis
By Philip R. Friedell
Attorney

Patented Aug. 8, 1939

2,168,391

UNITED STATES PATENT OFFICE 2,168,391

BAKING AND COOKING OVEN

Kenneth E. Bemis, Oakland, Calif.

Application April 19, 1938, Serial No. 202,912

7 Claims. (Cl. 107—57)

This invention, a baking and cooking oven and process of baking is adapted for all types of cooking and baking operations, such as roasting of meats, and baking of bread, biscuits, cakes and pies, and in this case is essentially directed to baking processes; adaptation to the various cooking and baking processes merely requiring variations in heating conditions, timing, and structural variations in carriers and containers.

Bread, cakes, and related products are customarily baked in ovens ranging from substantially square in vertical section to low flat horizontal ovens, and biscuits, cookies, and similar products are sometimes baked on traveling belts, which travel horizontally through the oven.

These horizontal type ovens require considerable floor space, require doors or curtained openings for introduction and removal of the products, thereby subjecting the foods during cooking or baking to drafts and changes of temperature when the doors are opened for introduction and removal and inspection of the products, and these ovens are usually provided with flues, creating circulation of air through the oven, all of which are detrimental toward the attainment of the best results, and decreasing efficiency through loss of heat.

This invention contemplates the provision of ovens of comparatively small cross-sectional area in a horizontal plane, requiring a minimum of floor space; and of considerable height, the height depending on the desired capacity and available head room. The greater the height of the oven, the faster the transporting means can be operated, thereby proportionately increasing the capacity.

Also, the ovens are made doorless and flueless and without means of through circulation, unless introduction of fresh air is essential to the success of the specific process; circulation being ordinarily confined entirely to the interior of the oven, and which confined circulation has the effect of maintaining a definite degree of saturation of the air within the oven.

Additionally, the ovens are provided with a baffle extending upwardly from a plane located above the bottom of the oven sufficiently to induce circulation of heat within the oven, and extending upwardly to a point intermediate the height of the oven and defining a selective initial or final high temperature baking zone, the balance of the oven constituting a normal baking zone, which derives its heat for normal baking operations by circulation from the high temperature zone.

This invention, in suitably small size, can be associated with other devices, such as in connection with barbecuing or roasting machines or ovens, for baking biscuits and similar products.

In describing the invention, reference will be had to the accompanying drawing forming a part of this specification, in which.

Figures 1, 2:
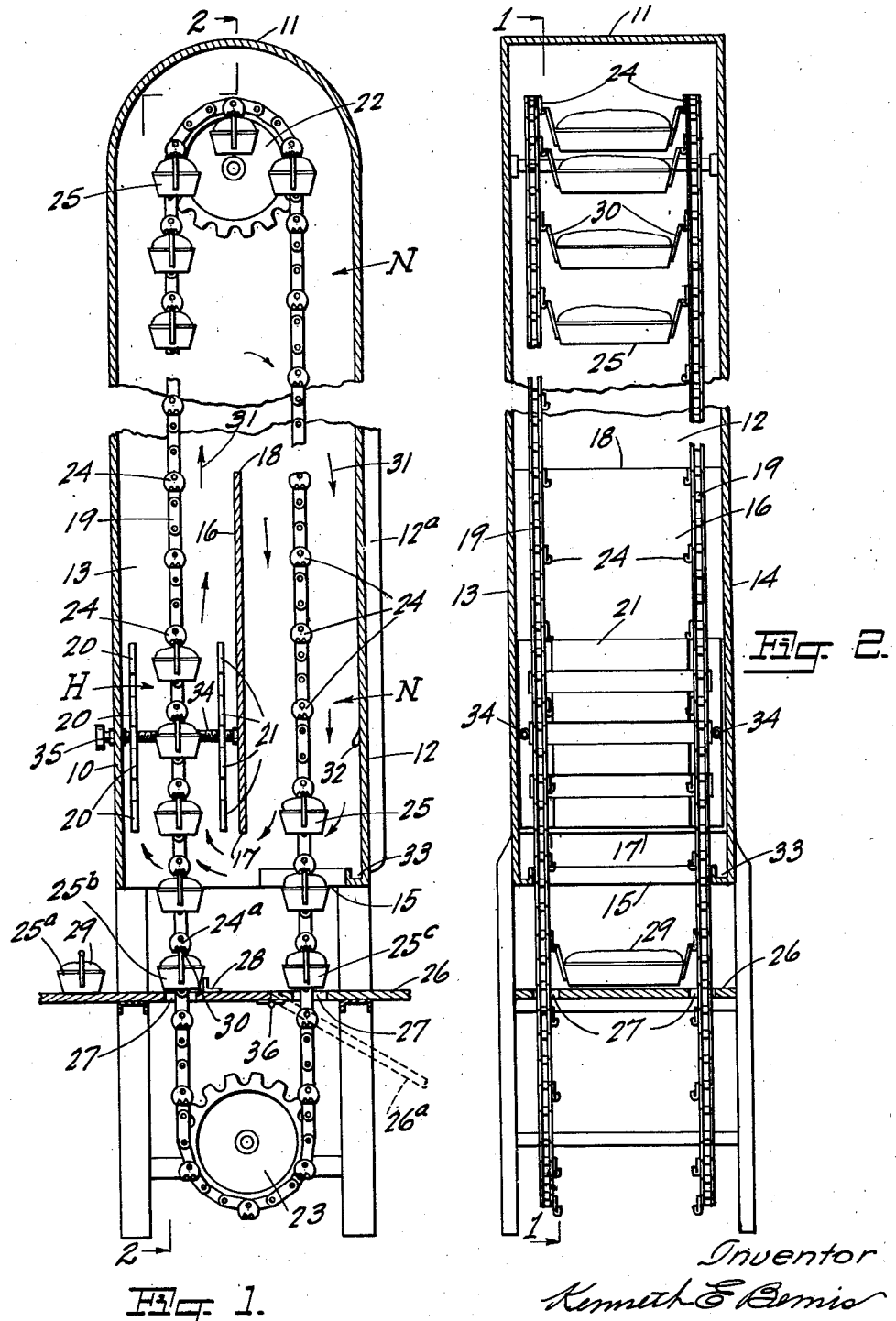
Fig. 1 is a sectional elevation through the invention and is taken on a line 1—1 of Fig. 2.
Fig. 2 is a section on line 2—2 of Fig. 1.

The invention consists of an oven having continuous front, top, and back walls respectively 10, 11 and 12, and side walls 13 and 14, forming a sealed casing with open bottom, there being no opening in any of these walls, and the bottom 15 being open for introduction and removal of the foods to be heat processed.

Situated centrally between the front and back walls and joining the side walls, is a baffle 16, the bottom end 17 of which is located a predetermined distance above the bottom 15 of the oven, and the top 18 of which extends upwardly to a point intermediate the height of the oven; this baffle defining the high temperature zone H from the balance of the oven which constitutes the normal temperature zone N, which includes the space back of the baffle, for normal temperature cooking and baking.

The conveyor chain 19 defines the opposed upward and downward travel paths for the food on opposite sides of the baffle, and heating units 20 and 21 are mounted in opposition on opposite sides of the travel path through the high temperature zone H.

Transporting means is provided for transporting the foods through the oven, from bottom to top and back out through the bottom, and is shown as consisting of the conveyor chains 19 operating overhead sprockets 22 located in the upper end of the oven, and tail sprockets 23 which are located below the bottom 15 of the oven.

The chains 19 are provided with suitable carrier attachments 24 for suitably picking up and supporting the carriers throughout the pass through the oven, in predetermined position and for releasing the carriers or containers 25 for removal after they have emerged from the bottom of the oven.

The oven is illustrated as adapted for manual feeding of the vertical conveyor or transporting means, in which a table 26 is located below the bottom 15 of the oven, and which has openings 27 through which the chains 19 with their attachments can pass, and which table is provided with a locating stop 28, so that a pan 25ª containing a product to be baked or cooked, as bread dough 29, can be manually moved to the position 25ᵇ against the stop 28, for placement relative to the next upwardly moving attachment 24ᵃ, which is in the position of just picking the pan off the table.

As the front strands of the chain 19 move upwardly through the openings 27 and reach the lifting and supporting fingers 30 for cooperation with the attachments, the attachments lift the pan with its contents off the table and carry it upwardly through the bottom 15 of the oven, and thence between the heating units 20 and 21 for initial high temperature baking, the conveyor picking up additional pans in sequence, and after passing through the high temperature zone H, the pan is transported upwardly, over, and down the other side on the back side of the baffle 16, finally emerging from the bottom 15, and upon the pan reaching the table in the position 25ᶜ, the pan with the baked or cooked product is left resting on the table while the chain with its attachments continues down through the openings 27.

The heat from the heating units 20, 21 travels upwardly through the zone H and down the other side of the baffle and about the lower end of the baffle as indicated by the arrow stream 31, thus maintaining a substantially uniform heat throughout the oven other than in the high temperature zone.

Obviously, there is some drop in temperature in the lower portion of the oven back of the baffle, and this lower temperature causes the heated air to give up some of its moisture content by condensation as indicated at 32 on the walls, and which condensation drains down into the trough 33 formed at the lower end of the oven.

Thus the moisture content of the air is maintained below an excessive value, and, condensation may be increased to reduce the humidity to a greater degree by forming condensing fins 12ᵃ on this portion of the rear of the oven.

The heating units 20 and 21 are made simultaneously adjustable relative to the path of travel, as by means of a right and left hand screw 34 which cooperates with both sets of heating units for adjusting them closer to or farther from the path of travel, the screw being provided with a knob externally of the oven for adjustment at will, as indicated at 35, so that the initial or high temperature may be more accurately controlled than is possible by the usual three-heat switches commonly used.

This adjustment provides for suitable regulation of temperature for various products, as to the initial or final heat processing requirements.

It will be noted that this oven and its mechanism is reversible as to operation. In such cases where low temperature is required at starting and a high temperature for finishing, it is merely necessary to reverse operation of the conveyor and feed from the opposite side of the table 26, in which case the pan 25ᶜ will be picked up and carried first through the normal temperature zone and finally through the high temperature zone and deposited as indicated at 25ᵇ.

The table 26 is shown hinged at 36, whereby the discharge end may be inclined to the position 26ᵃ, and when so inclined, as the pans reach the table, they are automatically released by the attachments, and when released, will slide down the incline, thus automatically clearing the space for the next following pan.

The following copending applications filed by me are related to this invention; Serial Number 202,910 filed Apr. 19, 1938, and issued Oct. 28, 1938, as Patent No. 2,138,813, for Barbecue machine; Serial Number 202,913 filed Apr. 19, 1938, for Process of cooking meats; Serial Number 202,911 filed Apr. 19, 1938, for Meat carrier for meat cooking devices.

It will be understood that variations in the process or in the construction and arrangement of parts, which variations are consistent with the appended claims, may be resorted to without determining from the spirit or scope of the invention or sacrificing any of the advantages thereof.

I claim:

1. An oven comprising a sealed casing having an open bottom and having a height a plurality of times greater than its depth from front to back; transporting means for carrying material to be baked in a vertical circuit through said oven and starting and terminating below the bottom of said oven and forming upward and downward travel paths; heating units arranged on both sides of one of said paths within a limited area to provide a high temperature radiant heat zone; the balance of the interior of said oven obtaining its heat from said units solely by circulation within the oven, a baffle located intermediate the front and back of said oven with its bottom edge located in spaced relation above the bottom of said oven and extending upwardly to a point intermediate the height of the oven and defining on one side thereof said high temperature zone, and inducing circulation of heat within said oven.

2. An oven comprising a sealed casing having an open bottom and having a height a plurality of times greater than its depth from front to back; transporting means for carrying material to be baked in a vertical circuit through said oven and starting and terminating below the bottom of said oven and forming upward and downward travel paths; heating units arranged on both sides of one of said paths within a limited area to provide a high temperature radiant heat zone; the balance of the interior of said oven obtaining its heat from said units solely by circulation within the oven in which a portion of said oven is provided with condensing means to promote condensation of moisture from the air circulating within the oven.

3. A baking and cooking oven comprising an enclosure having continuous top, side, front and back walls and an open bottom, and having a height equal to a multiplicity of times the distance between the front and back walls, and having a baffle located between the front and back walls with its lower end spaced above the bottom of the oven a sufficient distance to permit circulation of heated air thereabout within the confines of the oven, and extending upwardly intermediate the height of said oven defining on one side thereof a high temperature zone, and defining on opposite sides upward and downward travel paths respectively for materials to be processed by heat; and transporting means operating through the bottom of said oven and carrying said materials about said travel paths to complete the process of baking or cooking in a single pass; and heating means in said high temperature zone supplying heat by circulation to the remainder of the oven for normal temperature processing.

4. An oven as defined in claim 3; and means associated with said oven promoting condensation of excess moisture from the heated air during circulation within the oven.

5. A bottomless vertical oven having heating units therein, and a baffle centrally located and forming upward and downward travel paths and inducing circulation of heat confined entirely to the interior of the oven; said heating units being located on opposite sides of one of said paths and on one side only of said baffle; said baffle isolating the other path from direct radiant heat from said heating units.

6. A bake oven comprising a bottomless vertical oven sealed on all sides and at its top and having a central baffle forming two parallel vertical paths for material to be baked and having its upper and lower ends respectively spaced below the top and above the lower end of the oven to induce circulation of heat entirely within the oven; and heating units mounted in one of said paths to provide direct radiant heat and supplying heat by circulation to the other of said paths about said baffle.

7. A structure as claimed in claim 6, the mounting means for said heating units including means for simultaneously adjusting the heating units in opposition, at will.

KENNETH E. BEMIS.